UNITED STATES PATENT OFFICE.

EDWIN TAYLOR, OF FARMINGDALE, NEW YORK, ASSIGNOR TO UNION CLAY PRODUCTS COMPANY, OF NEW YORK, N. Y., A CORPORATION OF NEW JERSEY.

COMPOSITION CONTAINING VULCANIZED OIL AND PROCESS OF MANUFACTURE.

1,025,217.     Specification of Letters Patent.     Patented May 7, 1912.

No Drawing.     Application filed May 18, 1910. Serial No. 562,034.

*To all whom it may concern:*

Be it known that I, EDWIN TAYLOR, a citizen of the United States, residing at Farmingdale, Long Island, New York, have invented certain new and useful Improvements in Compositions Containing Vulcanized Oil and Processes of Manufacture, of which the following is a specification.

This invention relates to a product formed principally from a vulcanizable oil or resin, a nitrated oil and a nitro-cellulose, with or without the addition of clay. The product so formed is elastic, pliable and tough, having characteristics approaching those of soft rubber.

The invention resides in the composition of matter and in the process of manufacture. Its novel features will be apparent from the following description.

In making this composition, I use as a base, a product made in the manner set forth in a companion application Serial No. 561,466, filed May 14, 1910. As there described, a vulcanizable oil is heated in the presence of an excess of sulfur until vulcanization is complete, the result being a spongy mass which I call over-vulcanized oil and which is, more or less elastic, said elasticity varying with the proportion of sulfur used. The proportions used may vary within quite wide limits to suit various commercial requirements. For instance, 100 parts of oil, 150 parts of sulfur and 40 parts of clay produce a spongy mass, very hard and containing a large percentage of free sulfur, while a mixture containing 100 parts oil, 50 parts of sulfur and 40 parts of clay gives a mass very elastic under compression, and apparently containing all its sulfur in combination. In any case, I preferably grind the above spongy masses to as fine a state of division as practical to aid subsequent operations. I now add to the above comminuted mass, a composition containing a nitrated oil or resin and a nitrocellulose having preferably a content of nitrogen of less than twelve per cent. The proportions of these ingredients may vary within wide limits, as may also the nitrogen content but I have found by experiment that the nitrogen content should be below 12%. For instance, 90 parts of an oil containing four and one-half per cent. nitrogen, and 10 parts nitro-cellulose containing twelve per cent. nitrogen, may be added to 100 parts of the above vulcanized oil or resin, and this may be taken as a standard.

The nitro-oil and nitro-cellulose are mixed at a temperature of 212° to 250° F. and heating continued until the nitro-cellulose is dissolved by the oil. Instead of dissolving the nitro-cellulose in the oil, which is a somewhat slow operation, I may dissolve both in a common solvent such as acetone, this solvent being driven off and recovered after solution ensues. In either event, the admixed nitro-oil and cellulose is now added to say, an equal amount of the finely divided vulcanized oil, the mixture heated and incorporated on hot mixing rolls until the nitro-oil and nitrocellulose combine with the vulcanized oil. The resulting product is very elastic and rubber-like and is suitable for insulating flexible wires, etc. As a modification of this process I may add the spongy vulcanized oil containing an excess of sulfur to a mixture of a vulcanizable oil, nitrated oil and nitro-cellulose, mixing and heating them with or without a common solvent until combination ensues and part of the nitro-radical is replaced by sulfur. The nitro-cellulose composition tends to add toughness and tensile strength to the product and as its proportion is increased the toughness increases. The product thus produced is elastic and soft and is of such a nature as to take the place of rubber tubes used for insulating wires. It is also adapted for use as the tops of rubber boots and for other similar uses.

If the proportion of the spongy mass is increased the product is more elastic under compression and resists the action of acids better, but it has less tensile strength. If desired I may add clay to the mixture of the spongy mass and nitro-cellulose product and this will have the effect of rendering the composition harder.

Without limiting myself to the proportions indicated or to the exact operation described, what I claim is:

1. A composition containing vulcanized oil, nitrated oil and nitro-cellulose.

2. A composition containing vulcanized oil, nitrated oil, nitro-cellulose and clay.

3. A composition containing vulcanized oil, nitrated oil and nitro-cellulose containing less than twelve per cent. nitrogen.

4. A composition containing about 100 parts vulcanized oil and clay, 90 parts nitrated oil, and about 10 parts nitro-cellulose.

5. A composition containing vulcanized oil, clay, nitrated oil, vulcanizable oil and nitro-cellulose.

6. A composition containing nitrated oil, nitro-cellulose, clay, over-vulcanized oil and sulfur.

7. The herein described process consisting in dissolving nitro-cellulose in a nitrated oil and mixing the product with finely ground vulcanized oil and clay.

8. The herein described process consisting in vulcanizing oil in the presence of clay and an excess of sulfur, grinding the product and allowing it to cool, and mixing said product thoroughly with a solution containing nitrated oil and nitro-cellulose.

9. The herein described process consisting in vulcanizing oil in the presence of an excess of sulfur, grinding the product and allowing it to cool, and mixing said product thoroughly with a solution containing nitrated oil and nitro-cellulose.

10. The herein described process consisting in vulcanizing oil in the presence of an excess of sulfur and a clay containing sulfur, comminuting the product, and mixing it at a temperature below the vulcanizing temperature with a solution of nitrated oil and nitro-cellulose.

11. The process consisting in maintaining oil or resin at a vulcanizing temperature in the presence of a vulcanizing agent until the vulcanizing operation is completed, and mixing the product so obtained with a nitrated oil or resin and nitro-cellulose maintained at a vulcanizing temperature until part of the nitro-radical in the nitrated oil and nitro-cellulose is replaced by the vulcanizing agent.

12. The process consisting in maintaining oil or resin at a vulcanizing temperature in the presence of an excess of sulfur until the vulcanizing operation is complete, and mixing the product so obtained with a nitrated oil or resin and nitro-cellulose maintained at a vulcanizing temperature until part of the nitro-radical in the nitrated oil and nitro-cellulose is replaced by sulfur.

In testimony whereof I affix my signature in presence of two witnesses.

EDWIN TAYLOR.

Witnesses:
H. L. GILLESPIE,
H. G. MORROW.